United States Patent [19]

Dunn

[11] Patent Number: 4,475,977
[45] Date of Patent: Oct. 9, 1984

[54] NITRIDE ETCH BATH

[75] Inventor: Joseph V. Dunn, Santa Clara, Calif.

[73] Assignee: Retrotec, Inc., San Jose, Calif.

[21] Appl. No.: 496,834

[22] Filed: May 23, 1983

[51] Int. Cl.³ .................. B44C 1/22; C03C 15/00; C03C 25/06

[52] U.S. Cl. .................... 156/345; 156/627; 159/28 R

[58] Field of Search ........... 156/345, 626, 627, 637, 156/642; 159/28 R; 134/12, 105

[56] References Cited

U.S. PATENT DOCUMENTS 4,302,273 11/1981 Howard ................ 156/345
4,390,396 6/1983 Koblenzer ............ 134/12 X Primary Examiner—William A. Powell
Attorney, Agent, or Firm—Thomas E. Schatzel

[57] ABSTRACT

A nitride etch bath having an inner vessel encapsulated within an outer housing with an electric heating element sandwiched therebetween. A condensing collar is heat sealed about the top of the inner vessel and supports a condensing lid hinged to the collar. The condensing lid includes an array of enclosed channels and canals in the top and bottom of the lid for transporting a condensing medium. As acid is boiled in the inner vessel, hot acid water vapors rise and impact the condenser lid which condenses the vapors to a liquid utilizing the condensing medium to cool the lid surface. The condenser lid and collar seal the inner vessel to prevent vapor leakage.

13 Claims, 7 Drawing Figures

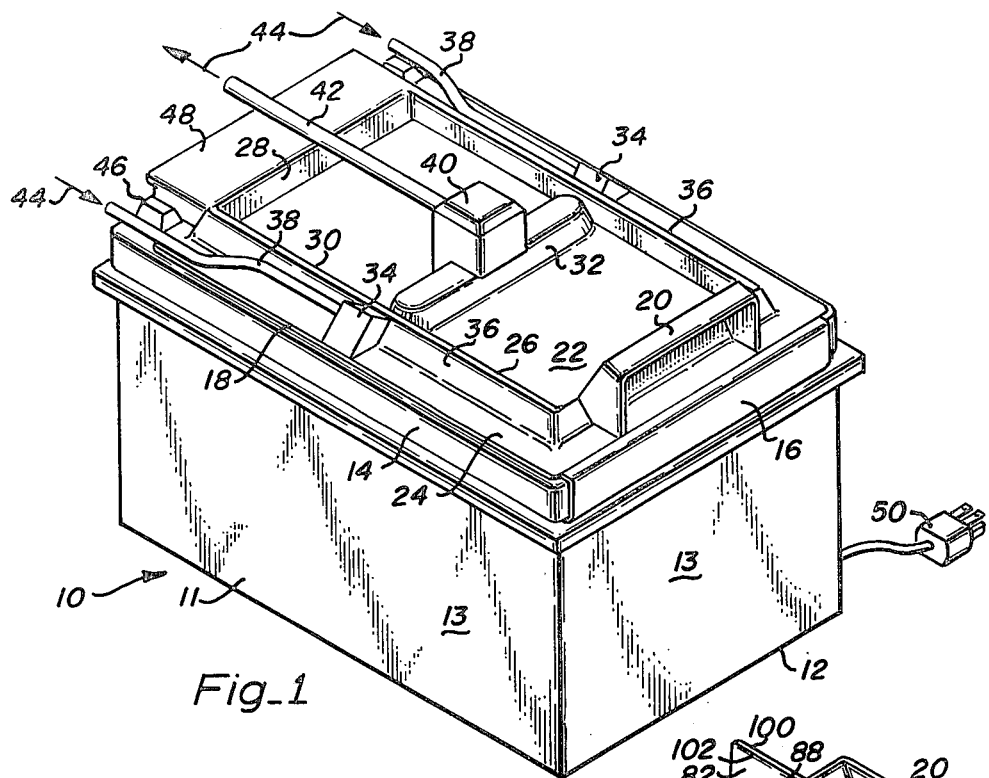
Fig_1
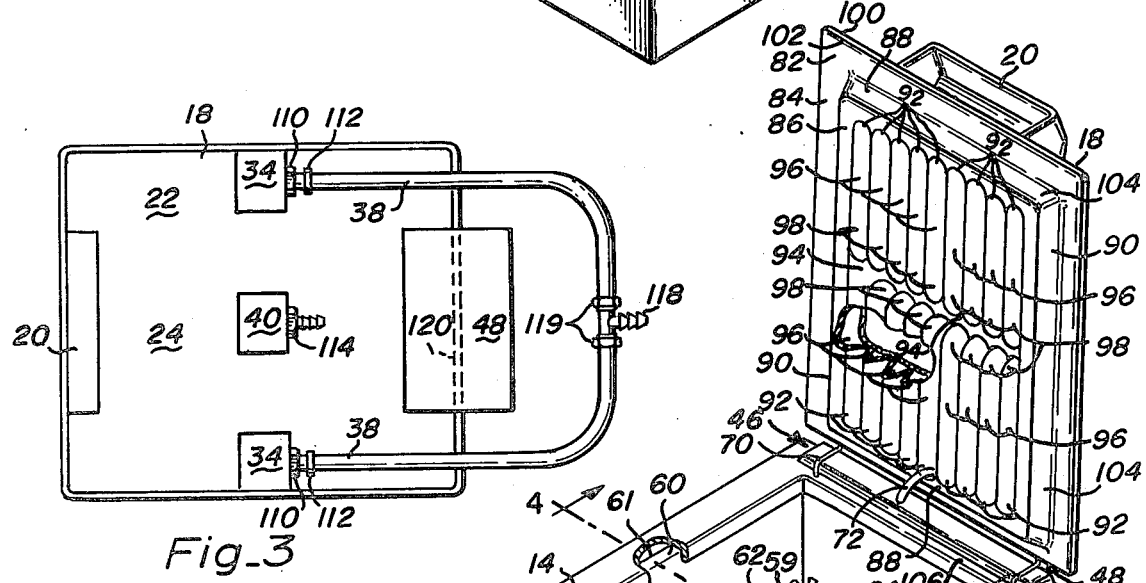
Fig_3
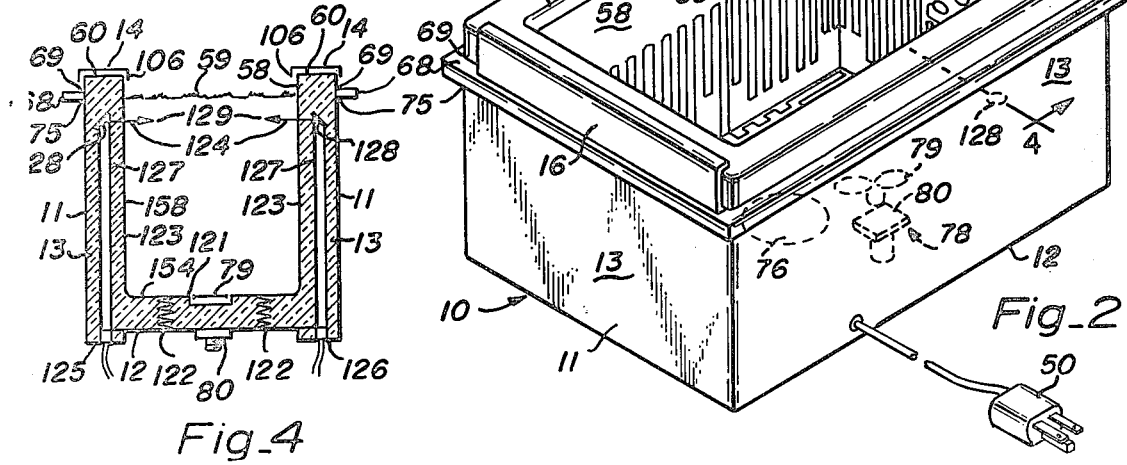
Fig_2
Fig_4

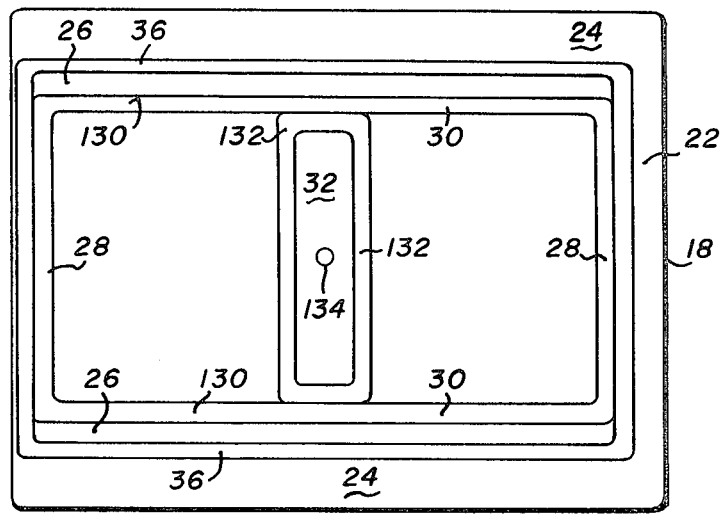
Fig_5
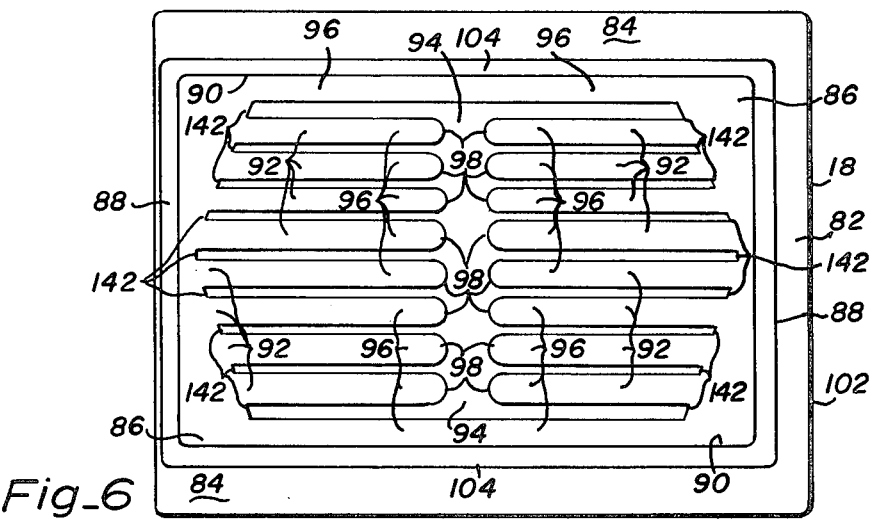
Fig_6
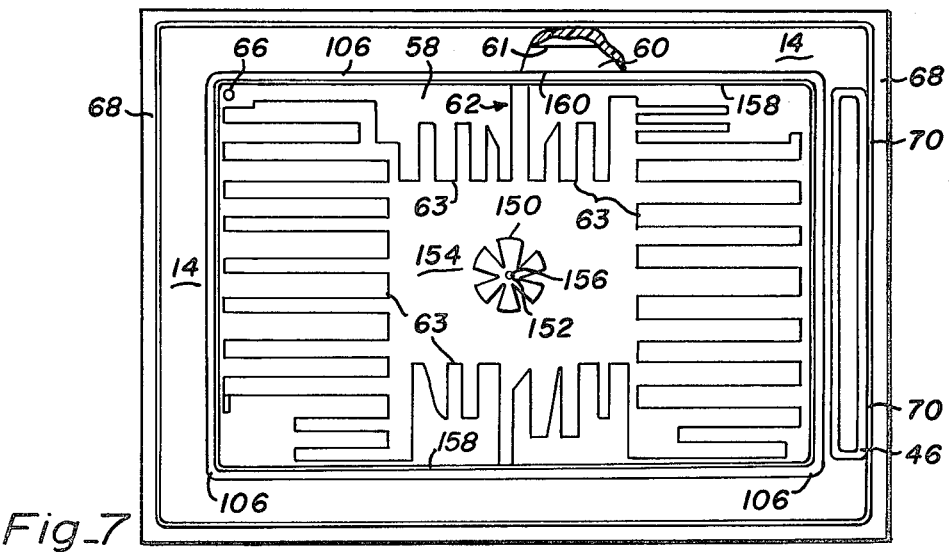
Fig_7

NITRIDE ETCH BATH

BACKGROUND OF THE INVENTION

1. Field of the Invention

The invention relates generally to nitride etch baths and more particularly to a nitride etch bath wherein the evaporation rate of the water vapor emitted from the bath is controlled by a condensing lid and collar.

2. Description of the Prior Art

In the semiconductor industry, boiling acid in a bath is utilized in the manufacturing process to etch away exposed areas of a wafer. A problem exists in that acid has a high concentration of water and at high temperatures (140–180)° C., the water evaporates at a rapid rate because water boils at 100° C. If the water in the acid evaporates, the chemical concentration in the bath varies changing the pH of the acid and in the extreme results in straight acid. If the solution becomes straight acid, a condition known as "heavy acid" results which accelerates the etching process. Under these conditions, an operator cannot control the etch rate in the bath. A solution to this problem is to control the evaporation rate of the water in the acid.

Attempts to solve this problem in the prior art included adapting a collar to fit over the top of a rectangular acid bath. The collar was constructed with an inlet to and an outlet from a series of quartz coils. The quartz coils carried a condensing medium and the quartz coils were suspended adjacent to the inner walls of the acid bath. A quartz lid rested on top of the collar and as the vapor fumes rose from the bottom of the acid bath the quartz lid reflected the fumes towards the collar. The collar then condensed to a liquid state those fumes that contacted the collar. A major problem with this solution was that if the water pressure changed, as when the system valves were not closed when the system was not utilized, the quartz collar would shatter due to stress caused by a sudden increase in water pressure. The quartz lids, being very heavy, were also subject to breakage and were expensive to replace. The quartz lid also leaked acid vapor droplets when removed from the acid bath making removal a hazard.

Another attempt to prevent the loss of water vapor from the acid bath included the fitting of the walls of the acid bath with teflon coils. As in the prior art, a heavy dense lid was placed over the acid bath. The heavy dense lid performed in the same manner as the quartz lid with all the previously described problems. The dense lid reflected the acid vapor fumes at the top of the bath and the teflon coils mounted on the bath walls performed the condensing function. As before, the side mounted coils were not efficient and the teflon on the condensing coils proved to be a thermal insulator further reducing the efficiency. A third attempt to prevent the loss of water vapor from the acid bath included mounting U-shaped condensing coils on the bottom of a quartz lid mounted on a quartz acid bath.

Another problem existed in sensing the liquid level in the acid bath. If the level dropped, the heater element could destroy itself. Attempts to solve this liquid level sensing problem included using a pressure switch within the tank. Increase in tank temperature as the liquid level dropped would not cause the pressure switch to operate properly because the air about the thermocouple operated pressure switch carried off the heat. Any instrument within the tank caused contamination to the acid bath and ultimate destruction to the instrument due to acid or acid fumes. Also, optical sensors mounted laterally to the acid bath failed to operate due to exposure to the acid fumes and due to refraction of the transmitted light wave because of multiple layers of the vessel. Although the condensation efficiency was improved, the previously described problems associated with quartz tops remained and the problem of controlling the water evaporation rate from the acid bath and sensing the liquid level still remains.

SUMMARY OF THE PRESENT INVENTION

It is therefore an object of the present invention to provide an improved nitride etch bath having a condensing collar and lid capable of efficiently controlling the evaporation rate of the water emitted from the bath.

It is a further object to provide an improved nitride etch bath having a modular condensing lid that is adaptable to acid baths produced by other manufacturers.

It is a further object to provide an improved nitride etch bath capable of more efficiently controlling the pH of the acid bath, reducing replacement water necessary at high temperatures and increasing predictability of the etch yield due to minimizing contamination.

It is a further object to provide an improved nitride etch bath having dual symmetrical condensing tubes housed within a hinged top-mounted lid for providing balanced condensation.

It is a further object to provide an improved nitride etch bath having a hermetically sealed condensing lid capable of containing either a water or a nitrogen condensing medium.

It is a further object to provide an improved nitride etch bath having inert lightweight, non-breakable and non-flammable components capable of resisting the corrosive effects of acid.

It is a further object to provide an improved nitride etch bath capable of operating at higher temperatures permitting shorter production cycles relative to comparable acid baths heretofore available.

Briefly, a preferred embodiment of the present invention includes a nitride etch bath having an inner vessel acting as an acid bath contained within an outer housing and a heating element and a liquid level sensor sandwiched therebetween. Mounted above a flange lip of the inner vessel is a condensing collar heat sealed above the flange lip. Hinged to the condensing collar is an unbreakable plastic, tight-fitting condensing lid. A top surface of the condensing lid provides a molded rectangular peripheral channel and an enclosed rectangular shaped cavity for the insertion and exhaust of a condensing medium flowing within the condensing lid. A bottom surface of the condensing lid includes an enclosed molded rectangular surface and a plurality of molded enclosed horizontal fingers extending inward from the enclosed molded rectangular surface forming a plurality of canals contiguous with the rectangular peripheral channel and the rectangular shaped cavity of the top portion.

As the water vapor rises from the boiling acid at the bottom of the inner vessel, the vapor contacts the bottom portion of the condensing lid. The condensing medium is inserted into the rectangular peripheral channel at two locations and travels simultaneously through a set of two short dimensions of the molded rectangular surface, through the plurality of enclosed horizontal fingers and exhausting from the condenser lid via the rectangular shaped cavity. Thus, the surface of the bottom portion of the condenser lid contacting the hot water vapor is constantly maintained at a cool temperature. The unbreakable, tight-fitting condenser lid in conjunction with the top-mounted cycling condensing medium and a water replacement tube efficiently control the water evaporation rate from the boiling acid so that the etch rate may be controlled. Effective liquid level sensing is provided by an infrared optical device located external to the acid bath.

An advantage of the nitride etch bath of the present invention is that the condensing collar and lid are capable of efficiently controlling the evaporation rate of the water vapor emitted from the bath.

Another advantage is that the nitride etch bath condensing lid is modular in that it is adaptable to acid baths produced by other manufacturers.

A further advantage is that the nitride etch bath is capable of more efficiently controlling the pH of the acid bath, reducing replacement water at high temperature, and increasing predictability of the etch yield by minimizing contamination.

A further advantage is that the nitride etch bath has dual symmetrical condensing tubes housed within a hinged top-mounted lid providing balanced condensation.

A further advantage is that the nitride etch bath has a hermetically sealed condensing lid capable of containing either a water or a nitrogen condensing medium.

A further advantage is that the nitride etch bath has inert light weight, non-breakable, and non-flammable components capable of resisting the corrosive effects of acid.

A further advantage is that the nitride etch bath is capable of operating at a higher temperature permitting shorter production cycles relative to comparable acid baths heretofore available.

These and other objects and advantages of the present invention will no doubt become obvious to those of ordinary skill in the art after having read the following detailed description of the preferred embodiment which is illustrated in the various drawing figures.

IN THE DRAWING

FIG. 1 is a perspective view of a nitride etch bath in accordance with the present invention;

FIG. 2 is an interior perspective view of the nitride etch bath of FIG. 1;

FIG. 3 is a plan view of the condenser lid insert-exhaust ports of the nitride etch bath of FIG. 1;

FIG. 4 is a cross-sectinal view of the nitride etch bath taken along line 4—4 of FIG. 2;

FIG. 5 is a plan view of the condenser lid top portion of the nitride etch bath of FIG. 1;

FIG. 6 is a plan view of the condenser lid bottom portion of the nitride etch bath of FIG. 1; and FIG. 7 is a plan view of the inner vessel of the nitride etch bath of FIG. 1.

DETAILED DESCRIPTION OF THE PREFERRED EMBODIMENT

In FIG. 1, there is illustrated a nitride etch bath referred to by the general reference character 10 and incorporating the present invention. The nitride etch bath 10 includes an outer housing 11, an outer housing base 12, a plurality of vertical walls 13, a condensing collar 14 with a retaining ring 16 and a condensing lid 18 with a molded handle 20. The condensing lid 18 further includes a top portion 22, a first planar layer 24, an enclosed molded rectangular peripheral channel 26, a short dimension 28 and a long dimension 30 of the peripheral channel 26, an enclosed rectangular shaped cavity 32, a pair of insert ports 34, a pair of external sides 36 of the long dimension 30, a pair of insert ducts 38, and exhaust port 40, and an exhaust duct 42. Also shown in FIG. 1 is a condensing medium 44, a raised portion 46 of condensing collar 14, a hinge cover 48, and an electrical connection 50.

In FIG. 2, the interior of the nitride etch bath 10 further illustrated, including an inner vessel 58 forming an acid bath 59, a continuous first flange lip 60, a plurality of edges 60 of the first flange lip 61, an electrical heater element 62, a plurality of electrical heater conductors 63, a thermal disc 64, a temperature sensing element 66, a second flange lip 68, a top exterior surface 69 of the outer housing 11, a hinge 70 and a water replacement tube 72. Outer housing 11 also includes a continuous top edge 75 about the vertical walls 13, a base center penetration 76, an agitation means 78, an agitating stir bar 79, and a nonmechanical coupling driver 80. FIG. 2 also shows a bottom portion 82 of condenser lid 18, a second planar layer 84, an enclosed molded rectangular surface 86, a short dimension 88 and a long dimension 90 of the rectangular surface 86, a plurality of molded enclosed horizontal fingers 92, a pathway 94 on the second planar layer 84, a plurality of enclosed canals 96, a plurality of terminal ends 98 of each of said fingers 92, a backside 100 of said top portion 22, a backside 102 of said bottom portion 82, an upward sloping bottom peripheral edge 104 of the enclosed molded rectangular surface 86, and a downward sloping inner peripheral edge 106 of condensing collar 14.

In FIG. 3 there is shown the top portion 22 of the condensing lid 18 further including a pair of insert hose adapters 110, a pair of insert O-clips 112, an exhaust hose adapter 114 adapted to receive an exhaust O-clip (not shown), a junction hose adapter 118, a pair of junction O-clips 119 and a hinge rod 120 (shown in phantom). In FIG. 4 there is shown a cross-sectional view of FIG. 2 further including a bottom recess 121, a pair of tank shock support coils 122, a blanket of thermal insulation 123, a liquid level sensor 124, an infrared transmitter and electrical connection 125, an infrared receiver and electrical connection 126, a pair of light channels 127, a pair of light reflectors 128, and an infrared beam 129. In FIG. 5 there is shown the top portion 22 further including a pair of internal sides 130 of the long dimension 30, a sloping exterior side 132 of the rectangular shaped cavity 32, and an exhaust opening 134. In FIG. 6 there is shown the bottom portion 82 further including a plurality of separation spaces 142.

FIG. 7 illustrates a plan view of the inner vessel 58 further showing an inner vessel drain plug 150, a hollow threaded cylindrical stub 152, an inner vessel bottom 154, a bottom center penetration 156, a plurality of vertical sides 158 and a continuous top 160 along the vertical sides 158.

Referring again to FIG. 1 the outer housing 11 includes the base 12 and the plurality of vertical walls 13 connected to the base 12. The outer housing 11 is open at the top and the base 12 includes a base center penetration 76 (shown in FIG. 2). The electrical connection 50 to the heater elements enters the nitride etch bath 10 through outer housing 11. The outer housing 11 is comprised of a non-breakable, lightweight, non-flammable plastic discussed herein. Integrally molded to a top exterior surface 69 (shown in FIGS. 2 and 4) of the vertical walls 13 of the outer housing 11 is the continuous second flange lip 68 (shown in FIG. 2). The purpose of the second flange lip 68 is to permit the nitride etch bath 10 to be supported or suspended. As shown in FIG. 2, the inner vessel 58 is mounted within the outer housing 11. The inner vessel 58 includes the inner vessel bottom 154 (shown in FIG. 7) with the bottom center penetration 156 vertically aligned with the base center penetration 76 of the outer housing 11. The inner vessel 58 includes the plurality of vertical sides 158 connected to the bottom 154. Connected to the continuous top 160 of the vertical sides 158 is the continuous first flange lip 60. The first flange lip 60 is then sealed to the continuous top edge 75 of the vertical walls 13 of the outer housing 11. The purpose of the inner vessel 58 is to contain the acid bath 59.

The condensing collar 14 shown in FIGS. 1 and 2 is also comprised of the inert, non-breakable, non-flammable plastic which is also acid resistant. The condensing collar 14 is mounted above and formed to cover the continuous first flange lip 60. Condensing collar 14 also includes the downward sloping inner peripheral edge 106 (also shown in FIG. 7). The downward sloping inner peripheral edge 106 is in physical communication with the first flange lip 60 of the inner vessel 58 and provides a surface for sealing the inner vessel 58 against liquid evaporation. The condensing collar 14 is secured in position above the first flange lip 60 by the retaining ring 16. The retaining ring 16 may be mounted about each of the plurality of edges 61 or about fewer than each of the edges 61. The retaining ring 16 is actually mounted under the edges 61 and is heat sealed to the condensing collar 14 at the edges 61. At one end of the condensing collar 14 is the raised portion 46 used to support the hinge 70. The hinge 70 permits the condenser lid 18 to rotate relative to the condensing collar 14. The condensing lid 18, which is mounted above and hinged to condensing collar 14, includes the upward sloping bottom peripheral edge 104 (also shown in FIG. 6). When the condensing lid 18 is closed, the upward sloping bottom peripheral edge 104 of the condensing lid 18 seals to the downward sloping inner peripheral edge 106 of the condensing collar 14. The condensing lid 18 also includes the cycling condensing medium 44 for controlling the evaporation rate of the water component within the acid bath 59 when operating at high temperature within the inner vessel 58.

The condensing lid 18 includes the top portion 22 (shown in FIGS. 1 and 4) and the bottom portion 82 (shown in FIGS. 2 and 6). The top portion 22 includes the molded handle 20 for lifting the lid 18 as it pivots about hinge 70 and the first planar layer 24 which acts as a reference plane. The enclosed molded rectangular peripheral channel 26 is raised vertically above the first planar layer 24 with the short dimension portions 28 and connected with the long dimension portions 30. The enclosed rectangular shaped cavity 32 is raised vertically above the planar layer 24 and is orthogonally center positioned within the long dimension portion 30. The peripheral channel 26 communicates with the insert ports 34 which are centrally mounted about the external side 36 of the portion 30 of the peripheral channel 26. The insert ports 34 accept the insert ducts 38 and the cavity 32 includes the exhaust port 40 which accepts the exhaust duct 42. The condensing medium 44, as shown in FIG. 1, enters the peripheral channel 26 via the insert ports 34 and leaves the rectangular shaped cavity 32 via the exhaust port 40. The hinge cover 48 is mounted atop the raised portion 46 of the condensing collar 14. In FIG. 5, the top portion 22 of lid 18 is shown without the condensing collar 14. Opposite each of the external sides 36 of peripheral channel 26 is one of the internal sides 130. Also the sides 132 of the formed cavity 32 slope down to the first planar layer 24. Additionally, the exhaust opening 134, where the condensing medium 44 is expelled, is visible in FIG. 5.

Referring again to FIGS. 2 and 6, and the bottom portion 82 of the condensing lid 18, the molded rectangular surface 86 rises vertically above the planar layer 84 as do the fingers 92 which extend inward from surfaces 88 (shown best in FIG. 6). Both sets of fingers 92 terminate to form the exterior pathway 94. Each canal 96 is formed between surface 86 and each terminal end 98 of each horizontal finger 92. As illustrated in the cutaway of FIG. 2, the backside 100 of the top portion 22 is permanently affixed to the backside 102 of the bottom portion 82. The cycling condensing medium 44 is then forced into each of the insert ports 34 and simultaneously flows to each of the short dimensions 88 of the rectangular surface 86, through each of the enclosed canals 96, and out each finger terminal end 98. The terminal ends 98 terminate into the bottom of the rectangular shaped cavity 32 of the top portion 22. The condensing medium 44 exits through cavity 32 through the port 40 after cooling the bottom portion 82 of the condensing lid 18. Note that the horizontal fingers 92 are separated from each other via the separation spaces 142. Also, the water replacement tube 72 is connected to the bottom portion 82 and is directed toward the inner vessel 58.

Referring to FIG. 3, the insert hose adaptors 110 are connected to the insert ports 34. The insert O-clips 112 physically connect the insert ducts 38 to adaptors 110. The exhaust hose adaptor 114 is connected to the exhaust port 40 and an exhaust O-clip to the exhaust duct 42. The junction hose adaptor 118 connects each duct 38 with the junction O-clip 119 locking the ducts 38 to the adaptor 118. Also, hinge rod 120 connects the condensing lid 18 to the condensing collar 14 via hinge 70 as shown in phantom.

Referring to FIG. 4, the bottom recess 121 within inner vessel bottom 154 supports the agitating stir bar 79. The nonmechanical coupling driver 80 is mounted directly below the outer housing base 12. The tank shock support coils 122 are mounted between the inner vessel bottom 154 and the outer housing base 12. The support coils 122 are designed to absorb shock and to protect the inner vessel 154 from breakage when the nitride etch bath 10 is dropped. The inner vessel 58 and outer housing 11 are separated by the blanket of thermal insulation 123 which surrounds the electrical heater element 62 shown in FIGS. 2 and 7. FIG. 4 shows the liquid level sensor 124 which is comprised of the infrared transmitter and electrical connection 125 and the infrared receiver and electrical connection 126. The transmitter 125 and receiver 126 may be mounted beneath the outer housing base 12 or within the outer housing 11 as the second flange lip 68 supports the nitride etch bath 10. However, the transmitter 125 and receiver 126 should preferably be mounted outside the outer housing base 12 to avoid failure due to testing element 62 and acid fumes from inner vessel 58. Furthermore, the transmitter 125 and receiver 126 can be mounted on the same side or opposite sides of the outer housing base 12. The pair of light channels 127 are optically connected to the transmitter 125 and receiver 126 by vertically aligning each channel 127 to the transmitter 125 or receiver 126. The channels 127 are then mounted intermediate the vertical walls 13 of the outer housing 11 and the vertical sides 158 of the inner vessel 58. Mounted atop each light channel 127 is the light reflector 128 which reflects the light transmitted by transmitter 125 and carried by channel 127 to the second light reflector 128 which reflects any received light down channel 127 to receiver 126. Thus, when the transmitter 125 and receiver 126 are on opposite sides of inner vessel 58 which contains liquid, the infrared beam 129 penetrates the inner vessel 58 but is reflected by the liquid, indicating liquid present. If the inner vessel 58 had no liquid at that level, the receiver would sense the transmitted infrared beam 129, indicating no liquid present. The sensor 124 is placed at the top of the electrical conductors 63 of heater element 62 to prevent the liquid level from dropping below that level to avoid heater element 62 damage. If both transmitter 125 and receiver 126 are positioned on the same side of outer housing base 12, then both light channels 127 and light reflectors 128 would also be on one side. Thus, in the presence of liquid, the infrared beam 129 is transmitted, reflected and received by receiver 126 indicating the presence of liquid. If liquid is absent, the transmitted infrared beam 129 is not reflected and received indicating no liquid present. By incorporating the liquid level sensor 124 as described, no contamination of the acid bath 59 results, resulting in higher production yields. Also, the infrared beam 129 need only travel through one layer of acid bath, the inner vessel 58 and not the outer housing 11.

Since an objective is to prevent evaporation of water from the acid bath 59 so that the pH concentration in the inner vessel 58 remains constant, the plastic condensing lid 18 and collar 14 are utilized. Since the condensing medium 44 is forced through both sections of fingers 92 of the lid 18 in a balanced simultaneous manner, the entire bottom portion 82 remains at a constant temperature. Thus, the condensing medium 44 is constantly circulating and the water replace tube 72 provides any replacement water required in the acid bath 59. An important feature in preventing water evaporation is to provide a condensing lid 18 with a bottom portion 82 that provides a large surface area for cooling. Thus, the waffle effect of the fingers 92 achieves this objective. Note that since the condensing medium 44 may be either cooling water or nitrogen, the condensing lid 18 is hermetically sealed for minimizing the loss of the condensing medium 44. The hermetically sealed condenser lid 18 will not leak even if the lid 18 is under pressure. Thus, as the water vapor rises in the inner vessel 58, the vapor strikes the cool bottom portion 82 of the condensing lid 18 and condenses back to a liquid prior to evaporating. The condensing lid 18 acts as a reflex radiator for the released vapors and prevents the vapors from escaping. The condensing collar 14 is designed in a mold and contoured to slope downward forming the downward sloping inner peripheral edge 106 which fits flush with the upward sloping bottom peripheral edge 104 of the bottom portion 82 of the condensing lid 18. Thus, a vapor-tight snug fit results because of edges 104 and 106, the heat produced by the electrical heater 62, and the weight of the condensing medium 44 when cooling water is used. The condensing collar 14 also provides the lid 18 with hinge support and will accommodate various acid bath manufacture types. Note that when the condenser lid 18 is open, the water vapor droplets will drain back into the inner vessel 58 and the water replacement tube 72 provides replacement water to maintain the pH constant. If the acid is not permitted to become heavy, the etch rate may be controlled and the production yield predictions are more valid. Thus, etching at high temperatures results in a faster controlled etch rate with increased production.

Referring now to FIGS. 2 and 7, the electrical heating element 62, comprised of the plurality of electrical conductors 63, is sandwiched between the base 12 and vertical walls 13 of the outer housing 11 and the bottom 154 and vertical sides 158 of the inner vessel 58. The electrical heater 62 and electrical conductors 63, best shown in FIG. 6, increase the temperature of the acid bath 59 within the inner vessel 58. The electrical heating element 62 also includes the temperature control means or thermal disc 64 which automatically regulates the temperature of the acid bath 59. The thermal disc 64 interrupts the electrical heating element 62 when the temperature of the acid bath 59 reaches 185° C. The temperature sensing element 66 automatically senses the temperature of the acid bath 59 within the inner vessel 58. The temperature sensing element 66 may be a less accurate thermocouple comprised of dissimilar metals or a more accurate but fragile glass probe thermistor.

FIG. 7 also illustrates the drain plug 150 mounted within the bottom 154 of the inner vessel 58. The hollow threaded cylindrical stub 152 extends from the bottom of the drain plug 150 in FIG. 7. The threaded stud 152 penetrates the bottom center penetration 156 of the inner vessel 58 and the base center penetration 76 of the outer housing 11. The threaded stud 152 is used to drain the acid bath 59 from the inner vessel 58 so that aspiration from the top of the acid bath 59 is not required. The agitation means 78 may be installed in addition to or in lieu of the drain plug 150 as shown in FIG. 2. The agitation stir bar 79 is mounted within the inner vessel bottom recess 121 and the nonmechanical coupling driver 80 is mounted beneath the base 12 of the outer housing 11. The nonmechanical coupler driver 80 may be a magnetic coupling driver or a pneumatic coupling driver. The agitation stir bar 79 agitates the contents of the inner vessel 58.

The outer housing 11, condensing collar 14, and condensing lid 18 are each comprised of an inert, non-breakable, non-flammable acid resistant plastic. The plastic is made of polyvinlidene fluoride and referred to as a sygef which resists the corrosive effects of acid. Sygef is listed (UL-94) by Underwriter Laboratory as a self-extinguishing plastic and is as inert as quartz but is unbreakable. The condensing lid 18 is vacuum formed and by using the waffle effect of fingers 92, the large surface area makes it a good thermal conductor. Sygef has a heat limitation of 140° C. but by forcing the condensing medium 44 through the canals 96, the lid 18 can be used at temperatures above 140° C. and no contamination results to lower production yields. Note that the inner vessel 58 is comprised of virgin quartz.

By the addition of the condensing collar 14, the retaining ring 16, and the condensing lid 18 with the hinge rod 120, any acid bath may be converted to a nitride etch bath 10. The condensing collar 14 becomes a permanent part of the inner vessel 58 and the lid 18 hinges relative to the collar 14. Thus, a modular feature exists because the condensing lid 18 is adaptable to other manufacturer's acid baths. Although an acid bath boils acid, an acid bath cannot operate in the (140°–180° C.)

range without constant supervision. This problem is eliminated by the nitride etch bath 10.

Thus, the nitride etch bath 10 will efficiently control the evaporation rate of water in acid, is modular in construction, efficiently controls the pH of the acid bath 59, reduces the replacement water requirement at high temperatures, increases the predictability of the yield due to minimized contamination, has dual condensing canals 96 mounted within the hinged top-mounted condensing lid 18, is lightweight, non-breakable, non-flammable and acid resistant and can operate at high temperatures permitting shorter production cycles.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An improved nitride etch bath comprising, in combination;
   an outer housing including a base and a plurality of vertical walls connected to said base and open at the top, said base including a center penetration;
   an inner vessel for containing an acid bath and mounted within the outer housing and comprising a bottom with a center penetration vertically aligned with said base center penetration of the outer housing, a plurality of vertical sides connected to said bottom with a continuous first flange lip connected to a continuous top of said vertical sides of the inner vessel, said first flange lip sealed to a continuous top edge of said vertical walls of the outer housing;
   a condensing collar comprised of an inert, non-breakable, non-flammable acid resistant material mounted above and formed to cover said continuous first flange lip, the condensing collar including a downward sloping inner peripheral edge in physical communication with said first flange lip for providing a surface for sealing the inner vessel against liquid evaporation;
   a retaining ring mounted about a plurality of edges of said inner vessel continuous first flange lip and heat sealed to the condensing collar at said edges for partially enclosing said first flange lip and securing the condensing collar in position above the first flange lip;
   a condensing lid mounted above and hinged to the condensing collar and including an upward sloping bottom peripheral edge for providing a seal between said upward sloping bottom peripheral edge of the condensing lid and said downward sloping inner peripheral edge of the condensing collar and further including a cycling condensing medium for controlling the evaporation rate of a water component within said acid bath operating at a high temperature within the inner vessel; and
   an electrical heating element comprised of a plurality of electrical conductors sandwiched between the base and vertical walls of the outer housing and the bottom and vertical sides of the inner vessel for increasing the temperature of said acid bath within the inner vessel.

2. The improved nitride etch bath of claim 1 wherein the condensing lid comprises a top portion and a bottom portion, said top portion including a molded handle and a first planar layer with an enclosed molded rectangular peripheral channel rising vertically above said first planar layer, said rectangular peripheral channel including a short dimension and a long dimension, said top portion further including an enclosed rectangular shaped cavity rising vertically above said first planar layer and being orthogonally center positioned within said long dimension of said peripheral channel, said peripheral channel including a pair of insert ports, each insert port centrally mounted on an external side of each of said long dimensions of said rectangular peripheral channel for accepting a pair of insert ducts and said rectangular shaped cavity including an exhaust port for accepting an exhaust duct, said bottom portion including a second planar layer with an enclosed molded rectangular surface rising vertically above said second planar layer, said molded rectangular surface including a short dimension and a long dimension and further including a plurality of molded enclosed horizontal fingers rising vertically above said second planar layer, said horizontal fingers extending inward from each of said short dimensions of said molded rectangular surface and terminating to form a pathway on said second planar layer, each of said horizontal fingers forming an enclosed canal between said molded rectangular surface and a terminal end of each of said fingers, and wherein a backside of said top portion is affixed to a backside of said bottom portion forming said condensing lid and wherein said cycling condensing medium being forced into each of said insert ports and simultaneously flowing to each of said short dimensions of said molded rectangular surface and through each of said enclosed canals to each of said finger terminal ends, said terminal ends terminating in said rectangular shaped cavity of said top portion, said condensing medium exiting said rectangular shaped cavity through said exhaust port for cooling said bottom portion of the condensing lid.

3. The improved nitride etch bath of claim 2 wherein said condenser lid is hermetically sealed for minimizing the loss of said condensing medium and wherein said condensing medium includes a water coolant and a nitrogen coolant.

4. The improved nitride etch bath of claim 1 further including a draining means, said draining means including a drain plug mounted within said bottom of the inner vessel and further including a hollow threaded cylindrical stub extending from the bottom of said drain plug and wherein said stub penetrates said bottom center penetration of the inner vessel and said base center penetration of the outer housing for draining said acid bath from the inner vessel.

5. The improved nitride etch bath of claim 1 further including an agitating means, said agitating means including an agitation stir bar mounted within a bottom recess of the inner vessel and further including a nonmechanical coupling driver mounted beneath said base of the outer housing said nonmechanical coupling driver including a magnetic or pneumatic coupling driver for agitating said acid bath within the inner vessel.

6. The improved nitride etch bath of claim 1 wherein said outer housing comprises an inert, non-breakable, non-flammable acid resistant plastic, said plastic comprised of polyvinlidene fluoride for resisting the corrosive effects of acid.

7. The improved nitride etch bath of claim 1 wherein said electrical heating element further includes a temperature control means for automatically regulating the temperature of said acid bath within the inner vessel to a maximum value.

8. The improved nitride etch bath of claim 7 wherein said temperature control means comprises a thermal disc, said thermal disc for interrupting said electrical heating element when the temperature of said acid bath is 185 degrees centigrade.

9. The improved nitride etch bath of claim 1 wherein said electrical heating means further includes a temperature sensing means for automatically sensing the temperature of said acid bath within the inner vessel.

10. The improved nitride etch bath of claim 9 wherein said temperature sensing means comprises a thermocouple.

11. The improved nitride etch bath of claim 9 wherein said temperature sensing means comprises a thermistor.

12. The improved nitride etch bath of claim 1 wherein the outer housing further includes a continuous second flange lip integrally molded to a top exterior surface of said vertical walls of the outer housing for supporting and suspending the nitride etch bath.

13. The improved nitride etch bath of claim 1 further including a liquid level sensor comprised of an infrared transmitter and an infrared receiver, said transmitter and receiver being mounted beneath the base of the outer housing, said level sensor further including a pair of light channels optically connected to said transmitter and receiver, each light channel mounted intermediate said vertical walls of said outer housing and said vertical sides of said inner vessel and a pair of light reflectors mounted atop said light channels for transmitting, reflecting and receiving an optical signal through said inner vessel for effective liquid level sensing.

* * * * *